May 24, 1955 C. JENKINS ET AL 2,709,087
TRUCK TRAILER WITH FIFTH WHEEL JACK
Filed March 23, 1953 2 Sheets-Sheet 1
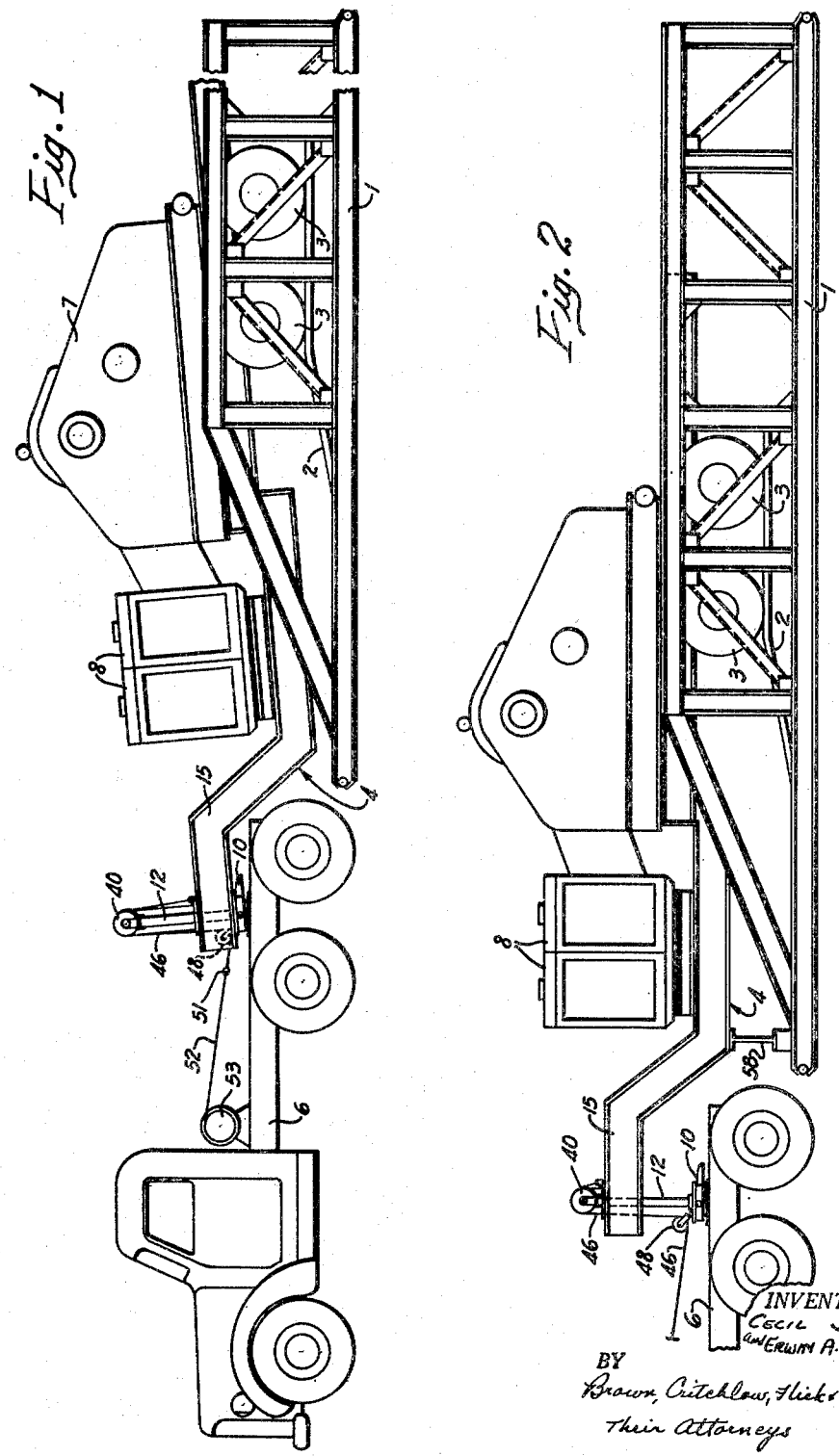
INVENTORS
CECIL JENKINS
AND ERWIN A. CAMPBELL
BY
Brown, Critchlow, Flick & Peckham
Their Attorneys

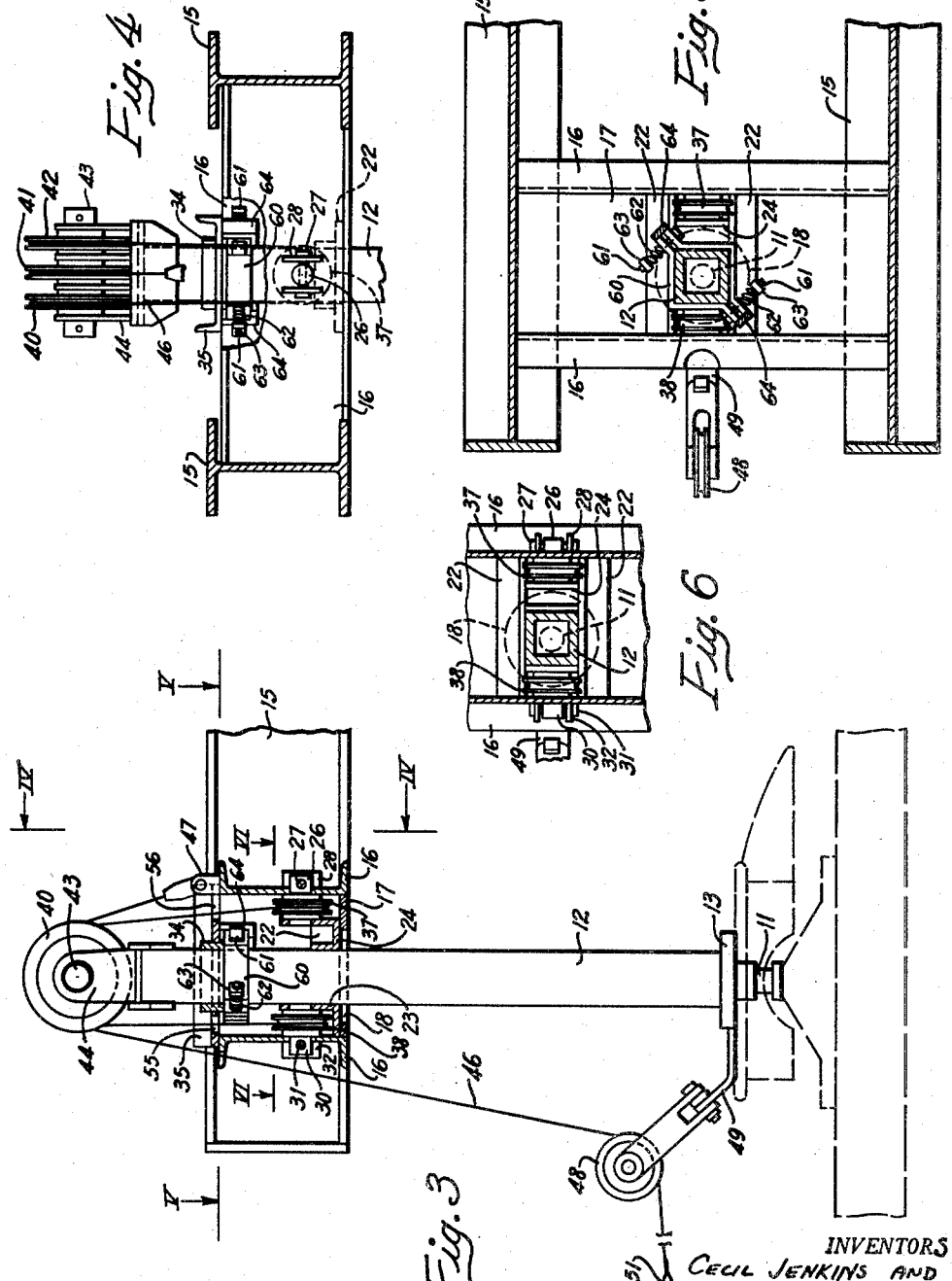

United States Patent Office 2,709,087
Patented May 24, 1955

2,709,087

TRUCK TRAILER WITH FIFTH WHEEL JACK

Cecil Jenkins, Tulsa, Okla., and Erwin A. Campbell, Wexford, Pa., assignors to Lee C. Moore Corporation, Pittsburgh, Pa., a corporation of Pennsylvania Application March 23, 1953, Serial No. 344,094

8 Claims. (Cl. 280—425)

This invention relates to trailer trucks, and more particularly to built-in jacks for lifting the front ends of semi-trailers above the fifth wheels of the tractors to which they are attached.

As is well known, a truck tractor fifth wheel is mounted so that it can rock on a horizontal axis transverse to the tractor, and is provided with a slot extending forward from its back for receiving a vertical king pin on the bottom of the front end of the trailer. The pin is held in the slot by a latch. When it is desired to separate the tractor from the trailer, the front portion of the trailer has to be supported on something and then the fifth wheel latch is released from the king pin so that the tractor can be driven away. In some cases, before the tractor and trailer are separated, it is desired to back the trailer up an incline to a higher level. Then, in order to level the trailer, its front end has to be raised after it has been disconnected from the tractor. This generally requires considerable time and effort, since it usually has to be done by placing manually operable jacks beneath the trailer and then elevating them.

It is among the objects of this invention to provide a truck semi-trailer which has a power jack built into its front end for leveling the trailer, which can be leveled while it is still attached to the tractor, and which has a built-in jack that forms part of the connection between the trailer and the fifth wheel on the tractor.

In accordance with this invention a post is mounted in the front end of a semi-trailer frame, where it is slidable up and down. A king pin projects from the lower end of the post for connection to the fifth wheel of the tractor, by which the trailer is hauled. Sheaves are supported by the upper end of the post and the trailer frame near the post. A line is reeved around the sheaves and has one end anchored near one of them. The opposite end of the line is adapted to be connected to a winch on the tractor. When the winch is operated to reel in the line, it lifts the frame by sliding it upward on the post. After the front end of the trailer is raised in this manner, it can be blocked up and the tractor driven away from it. This operation is just reversed when the tractor is brought back to hook onto the trailer. The post may be provided with a friction clamp that will prevent it from dropping when the fifth wheel of the tractor is withdrawn from beneath the post.

The preferred embodiment of the invention is illustrated in the accompanying drawings, in which Fig. 1 is a side view of our trailer just after it has been backed up onto a ramp in an oil well derrick substructure;

Fig. 2 is a side view showing the trailer after its front end has been elevated and blocked up, but before the tractor has been removed;

Fig. 3 is an enlarged longitudinal section through the front end of the trailer, showing the fifth wheel jack in elevation;

Fig. 4 is a vertical transverse section through the trailer frame, taken on the line IV—IV of Fig. 3;

Fig. 5 is a horizontal section taken on the line V—V of Fig. 3; and

Fig. 6 is a fragmentary horizontal section taken on the line VI—VI of Fig. 3.

Referring to Fig. 1 of the drawings, an oil well derrick substructure 1 of a familiar form is shown, which is bifurcated at one end to provide a deep recess in which ramps 2 are located. Resting on the horizontal upper portions of these ramps are the wheels 3 that support the rear end of the bed of a truck semi-trailer 4. The front end of the trailer is connected to the back of a tractor 6 in a manner that will be described presently. The tractor has just backed the trailer up the ramps, so the trailer is tilted down toward the tractor. Mounted on the trailer are the drawworks 7 and engines 8 that are to be used in a well drilling operation. Of course, as far as this invention is concerned, it is immaterial what is carried by the trailer and whether it is backed up into a substructure or onto some other elevated support.

The back part of the tractor is provided with the usual transversely pivoted fifth wheel 10 for detachable connection to the trailer and for supporting its front end. The trailer is provided with a vertical king pin that is received by the standard latch (not shown) at the inner end of the customary slot in the fifth wheel. As shown in Fig. 3, the king pin 11 is rigidly mounted on the lower end of a square post 12 which is surrounded by a circular collar 13 that rests on top of the fifth wheel. The post extends up between the front ends of the side members or I-beams 15 of the trailer frame, and also between a pair of parallel cross members or channels 16 that have their ends secured to the I-beams. Welded between the lower portions of the cross channels is a flat plate 17 that is provided with a circular opening 18 which fits snugly around the collar 13 at the lower end of the post when the front end of the tractor is in its lower traveling position, as shown in Fig. 1. The tractive force of the tractor, therefore, is transmitted to the trailer through the fifth wheel, king pin, collar and plate 17.

The post is held in the center of plate opening 18 and at right angles to beams 15 by a pair of vertically spaced sleeves. The sleeves are square to fit the post and prevent it from turning. As shown in Figs. 3 and 6, the opposite sides of the lower sleeve can be formed by the vertical flanges of a pair of angle bars 22 that extend across the top of plate 17. The front of the sleeve is formed by an angle bar 23, and the back of the sleeve by the short vertical flange of a J-bar 24. Mounted in an opening in the tall flange of the J-bar is a short shaft 26 that extends back through an opening in the rear cross channel 16. The shaft is held in place by a pin 27 extending through its projecting rear end and a pair of vertical plates 28 secured to the back of the channel. Another short shaft 30 has its rear end mounted in the vertical flange of front angle bar 23, and its front end extending through the front cross channel, where it is held in place by a cross pin 31 extending through vertical plates 32 secured to that channel.

Upper sleeve 34 is rigidly mounted in a square opening in the web of a short horizontal channel member 35, the opposite ends of which are welded to the tops of the cross channels 16. The post is slidable vertically in the two sleeves and is held and guided by them.

Journaled between the cross channels on the short shafts 26 and 30 are sheaves 37 and 38, respectively. Three more sheaves 40, 41 and 42 are journaled on a horizontal shaft 43 at the top of the post. This shaft is disposed at right angles to the shafts below it and is mounted in a forked member 44 secured to the top of the post. Passing around all of these sheaves is a cable or line 46. Although the line can be reeved around the sheaves in different ways, for maximum strength and stability it is preferred to anchor the rear end of the line to a lug 47 mounted on the rear cross channel. The line then extends up and forward over the top of the center sheave 41 and down around the sheave 38 in front of the post. From there the line extends up and over one of the end sheaves and down around the sheave 37 behind the post. The line then extends up and over the other end sheave and down and under a snatch block sheave 48 in front of the lower portion of the post. As shown in Fig. 3, the snatch block is pivotally connected to the front end of an arm 49 extending forward from the front of traction collar 13. From the snatch block the line extends forward a short distance and has its front end provided with an eye 51 so that it can be fastened to a cable 52 (Fig. 1) attached to a winch 53 on the tractor.

Horizontal channel member 35 is provided with front and rear slots 55 and 56 that permit line 46 to extend through it. Rear channel 16 is located farther behind the post than necessary so that the length of line between it and the center sheave 41 will resist to a large extent the tendency of the length of line between the snatch block and the upper sheaves to tilt the post forward.

After the trailer has been backed up the ramp as shown in Fig. 1, the winch is operated to reel in cable 50 and the jack line attached to it. This causes the line to lift lower sheaves 37 and 38 and thereby slide the front end of the trailer frame up the stationary post until a cross beam 58 can be placed under the trailer. Then the trailer is lowered onto the beam, as shown in Fig. 2, which holds the trailer level. The tension in line 46 then can be released and the line disconnected from the winch cable, whereupon the fifth wheel 10 can be unlatched from king pin 11 and the tractor driven away from the trailer.

To prevent post 12 from sliding down when the fifth wheel is removed from beneath it, in which case the post would have to be raised again before the fifth wheel could be backed under it, a friction clamp is mounted on the post. This clamp preferably is formed from a pair of bars 60, each of which is bent 90° to fit against two sides of the post. Also, the opposed ends of the two bars are bent outward in parallel relation and spaced apart, as shown in Fig. 5. A pin 61 is slidably mounted in aligned openings in each pair of bar ends, and has its head engaging one of the bars. A coil spring 62 on the other end of the pin is compressed between the other bar and a nut 63 screwed on the pin. The two springs force the clamp bars against the post tightly enough to support it, but allow the post to be forced vertically through the clamp, when necessary. The clamp is located between the upper sleeve 34 and the lower ends of a pair of hooks 64 that are attached to the bottom of the top channel member 35. The hooks project beneath the out-turned ends of the clamp bars to support the clamp and post when the post is hanging free in the clamp. When the jack line 46 is reeled in, the hooks will slide the clamp up the post. When the line is released after beam 58 is removed and the tractor has been backed under the post, the weight of the trailer will cause the upper sleeve to push the clamp down on the post until collar 13 has entered recess 18 in the bottom of the guide means for the post.

It will be seen that with the construction disclosed herein there are no separate jacks to bother with and little human energy is required to level the trailer. The jack is always in position as a part of the connection between the trailer and tractor. It takes only a moment to operate the jack, and usually does not require any extra equipment because the tractors that haul this kind of trailer generally are provided with winches.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A truck semi-trailer comprising a frame, guide means rigidly mounted in the front end of the frame, a post mounted in said means and slidable vertically therein, the post projecting above the guide means, a king pin projecting from the lower end of the post adapted to connect the trailer to the fifth wheel of a tractor, a traction collar rigidly mounted on the lower portion of the post, said guide means having a bottom recess normally receiving said collar snugly, sheaves supported by the upper end of the post and said frame near the post, and a line reeved around said sheaves with one end anchored near one of them and with the opposite end adapted to be connected to a winch on the tractor, whereby said guide means and front end of the frame can be slid upward on the post to elevate said front end.

2. A truck semi-trailer comprising a frame, a post mounted in the front end of the frame and slidable vertically therein, a friction clamp surrounding the post, means restricting vertical movement of the clamp relative to the frame, said clamp engaging the post tightly enough to support it when the post is unsupported otherwise, a king pin projecting from the lower end of the post adapted to connect the trailer to the fifth wheel of a tractor, sheaves supported by the upper end of the post and said frame near the post, and a line reeved around said sheaves with one end anchored near one of them and with the opposite end adapted to be connected to a winch on the tractor, whereby the front end of the frame and said clamp can be slid upward on the post to elevate said front end.

3. A truck semi-trailer comprising a frame, a post mounted in the front end of the frame and slidable vertically therein, a king pin projecting from the lower end of the post adapted to connect the trailer to the fifth wheel of a tractor, three sheaves mounted on the upper end of the post, a pair of sheaves supported by the frame on opposite sides of the post, and a line having one end anchored to the frame and extending upward therefrom and over the center upper sheave and down around the sheave below it and then up and over one of the other upper sheaves and down around the other lower sheave and then up and over the remaining upper sheave, the opposite end of the line being adapted to be connected to a winch on the tractor, whereby the front end of the frame can be slid upward on the post to elevate said front end.

4. A truck semi-trailer comprising a frame, a post mounted in the front end of the frame and slidable vertically therein, a king pin projecting from the lower end of the post adapted to connect the trailer to the fifth wheel of a tractor, three sheaves mounted on the upper end of the post, a pair of sheaves supported by the frame on opposite sides of the post and substantially at right angles to the upper sheaves, a single sheave in front of the lower portion of the post, means supporting said single sheave from the post, and a line having one end anchored to the frame behind the post and extending upward therefrom and over the center upper sheave and down around the sheave below it and then up and over one of the other upper sheaves and down around the other lower sheave and then up and over the remaining upper sheave and down and forward under said single sheave, the forward end of the line being adapted to be connected to a winch on the tractor, whereby the front end of the frame can be slid upward on the post to elevate said front end.

5. A truck semi-trailer comprising a pair of laterally spaced side frame members, a pair of laterally spaced cross members connecting the front ends of said members, a vertical sleeve rigidly mounted between said cross members, a post slidably mounted in the sleeve, a king pin projecting from the lower end of the post adapted to connect the trailer to the fifth wheel of a tractor, a vertical sheave rotatably supported by each of said cross members beside the post, vertical sheaves mounted on the upper end of the post, and a line reeved around all of said sheaves with one end anchored near one of them and with the opposite end adapted to be connected to a winch on the tractor, whereby the front ends of the side frame members can be slid upward on the post to elevate them.

6. A truck semi-trailer comprising a pair of laterally spaced side frame members, a pair of laterally spaced cross members connecting the front ends of said members, a pair of vertically spaced vertical sleeves rigidly mounted between said cross members, a post slidably mounted in the sleeves, a king pin projecting from the lower end of the post adapted to connect the trailer to the fifth wheel of a tractor, a friction clamp surrounding the post between the sleeves, means between said cross members supporting the clamp, the clamp engaging the post tightly enough to support it when the post is unsupported otherwise, a king pin projecting from the lower end of the post adapted to connect the trailer to the fifth wheel of a tractor, sheaves supported by the upper end of the post and said frame near the post, and a line reeved around said sheaves with one end anchored near one of them and with the opposite end adapted to be connected to a winch on the tractor, whereby the front ends of the side frame members and said clamp can be slid upward on the post to elevate them.

7. A truck semi-trailer comprising a frame provided with a pair of laterally spaced beams extending lengthwise of the frame, means connected to the front ends of the beams and extending across the space between them, a post extending through said means and slidable vertically therein, the upper end of the post being disposed above the frame, a king pin projecting from the lower end of the post adapted to connect the trailer to the fifth wheel of a tractor, sheaves supported by the upper end of the post and said means near the post, and a line reeved around said sheaves with one end anchored near one of them and with the opposite end adapted to be connected to a winch on the tractor, whereby said means can be slid upward on the post to elevate the front end of said frame.

8. A semi-trailer according to claim 3, in which the frame includes a pair of laterally spaced beams extending lengthwise thereof, and said post extends through means connected to the front ends of the beams and extending across the space between them.

References Cited in the file of this patent

UNITED STATES PATENTS

| | | |
|---|---|---|
| 1,546,261 | Spencer | July 14, 1925 |
| 1,590,615 | Culver | June 29, 1926 |